US008125355B2

(12) United States Patent
    Soderlund

(10) Patent No.: US 8,125,355 B2
(45) Date of Patent: Feb. 28, 2012

(54) QWERTY-KEYBOARD FOR MOBILE COMMUNICATION DEVICES

(75) Inventor: Marcus Soderlund, Stockholm (SE)

(73) Assignee: Sony Ericsson Mobile Communications AB, Lund (SE)

( * ) Notice: Subject to any disclaimer, the term of this patent is extended or adjusted under 35 U.S.C. 154(b) by 784 days.

(21) Appl. No.: 12/133,680

(22) Filed: Jun. 5, 2008

(65) Prior Publication Data

US 2009/0305751 A1   Dec. 10, 2009

(51) Int. Cl.
    *H03K 17/94*   (2006.01)
    *H04K 3/00*    (2006.01)
(52) U.S. Cl. .......................................... 341/22; 400/485
(58) Field of Classification Search .................. 341/22; 200/5 A, 518; 345/169; 400/485, 489; 379/433.07
    See application file for complete search history.

(56) References Cited

U.S. PATENT DOCUMENTS

| 7,378,991 B2 * | 5/2008 | Dietz et al. ....................... 341/22 |
| 2006/0018463 A1 | 1/2006 | Rak et al. |

FOREIGN PATENT DOCUMENTS

| EP | 1 777 609 A1 | 4/2007 |
| WO | 01/71746 A1 | 9/2001 |
| WO | WO2007/042115 A1 | 4/2007 |

OTHER PUBLICATIONS

International Search Report, corresponding to PCT/EP2008/067209, mailed Mar. 30, 2009.
Written Opinion of the International Searching Authority, corresponding to PCT/EP2008/067209, mailed Mar. 30, 2009.

* cited by examiner

*Primary Examiner* — Lee Nguyen
(74) *Attorney, Agent, or Firm* — Renner, Otto, Boisselle & Sklar, LLP (57) ABSTRACT

The invention relates to a mobile communication device, with a casing and a keypad comprising a plurality of keys and a plurality of rotatable key elements comprising a protrusion. Each key element is adapted to depress a first key in a first direction, when rotated in a first rotating direction, and depress a second key in said first direction, when rotated in a second rotating direction. Each key element is adapted to be rotated in said first rotating direction upon application of a force onto the protrusion in a second direction. Each key element is adapted to be rotated in said second rotating direction upon application of a force onto the protrusion in a third direction. The second and third direction is opposite to each other, and the first direction is perpendicular to said second and said third direction.

12 Claims, 10 Drawing Sheets

QWERTY-KEYBOARD FOR MOBILE COMMUNICATION DEVICES

TECHNICAL FIELD

The present invention relates to the field of mobile communication devices and, in particularly, to the usage of a QWERTY-keyboard for character input in a handheld communication device.

BACKGROUND

Modern-day handheld communication devices are capable of performing a multitude of tasks ranging from voice communication, browsing the Internet, creating and editing documents, and sending e-mails. All of theses tasks require that the user enters characters and operates the device via some kind of input means.

A typical input mean in a handheld communication device, such as a mobile phone, is a numerical keypad. Since handheld devices often are quite small in physical size, the keys on the numerical keypad must also be small and often placed very close together. This makes entering characters using a numerical keypad a cumbersome and error prone operation.

To mitigate some of the effects discussed above a full QWERTY-keypad (one key per character), with adequate spacing between the keys, could be used. However, fitting a full QWERTY-keypad with adequate spacing between the keys on a handheld device is not possible without making either the keys tiny, or making the device larger enough to accommodate all the keys. Neither of these approaches is desirable from a user-friendliness point of view.

Document WO2007/042115 discloses a keypad that uses dual operation keys, or twin keys, to mitigate some of the effects discussed above. Each twin key may be used to select one of two possible characters, thus reducing the total number of keys needed, while still offering a full QWERTY-keypad, considerably. However, the space (footprint) needed on the devices casing to accommodate the twin keys are still quite large, making the device bulky. Reducing the size of the twin key, or placing them tighter together, is not an option since it would seriously effect the user-friendliness and make the input operation more prone to errors.

Therefore, it is a necessity to provide a user-friendly full QWERTY-keypad, comprising keys having a small footprint, for handheld communication devices, which do not consume precious space on the devices casing.

SUMMARY OF THE INVENTION

With the above and following description in mind, then, an aspect of the present invention is to provide a user-friendly and space conservative key for a keypad, which seeks to mitigate, alleviate, or eliminate one or more of the above-identified deficiencies in the art and disadvantages singly or in any combination.

An aspect of the present invention relates to a mobile communication device, comprising a casing and a keypad comprising a plurality of keys and a plurality of rotatable key elements comprising a protrusion, wherein each key element is adapted to depress a first key in a first direction, when rotated in a first rotating direction, and depress a second key in said first direction, when rotated in a second rotating direction, each key element is adapted to be rotated in said first rotating direction upon application of a force onto the protrusion in a second direction, each key element is adapted to be rotated in said second rotating direction upon application of a force onto the protrusion in a third direction, said second and third direction are opposite to each other; and said first direction is perpendicular to said second and said third direction.

The mobile communication may further comprise a casing with one opening for each protrusion on said key element.

The mobile communication device may further be embodied in such way that only said protrusion of the key elements protrude through the casing.

The mobile communication device may further comprise an embodiment wherein the protrusion is elongated in a direction coinciding with the normal to the first and second rotating directions.

The mobile communication device may further comprise an embodiment wherein the key element is adapted to depress the said first and second key simultaneously upon application of a force on the protrusion in said first direction.

The mobile communication device may further comprise an embodiment wherein the keypad comprises at least 18 keys and at least 9 key elements.

The mobile communication device may further comprise an embodiment wherein the keypad comprises at least 26 keys and at least 13 key elements.

The mobile communication device may further comprise an embodiment wherein the keypad comprises at least 12 keys and at least 6 key elements.

The mobile communication device may further comprise an embodiment wherein each key is adapted to send a signal when being depressed, whereby each signal represents a character.

The mobile communication device may further comprise an embodiment wherein the keypad is a QWERTY-keypad.

The mobile communication device may further comprise an embodiment wherein the first and the second keys and the key element is an integrated part.

A second aspect of the present invention relates to a method for operating a keypad of a mobile communication device, comprising a plurality of keys and a plurality of rotatable key elements comprising a protrusion, comprising the steps of rotating the key element in a first rotating direction to depress a first key by operating the protrusion, and rotating the key element in a second rotating direction to depress a second key by operating the protrusion, and depressing the protrusion in a first direction to depress said first and second keys simultaneously, wherein a depression of a key generates a signal which corresponds to a character.

The method may further comprise a depression of a single key generates a first signal and depression of two keys simultaneously generates a second signal.

The method may further comprise a first signal corresponds to a letter or a symbol and the second signal corresponds to a number.

Any of the first and second aspect presented above of the present invention may be combined in any way possible.

BRIEF DESCRIPTION OF THE DRAWINGS

Further objects, features, and advantages of the present invention will appear from the following detailed description of some embodiments of the invention, wherein some embodiments of the invention will be described in more detail with reference to the accompanying drawings, in which.

DETAILED DESCRIPTION

Embodiments of the present invention relate, in general, to the usage of a QWERTY-keyboard with rockable keys for character input in a handheld communication device. A preferred embodiment relates to a portable communication device, such as a mobile phone, including a QWERTY-keyboard with rockable keys. However, it should be appreciated that the invention is as such equally applicable to electronic devices which do not include any radio communication capabilities. However, for the sake of clarity and simplicity, most embodiments outlined in this specification are related to mobile phones.

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference signs refer to like elements throughout.

Figure 1:
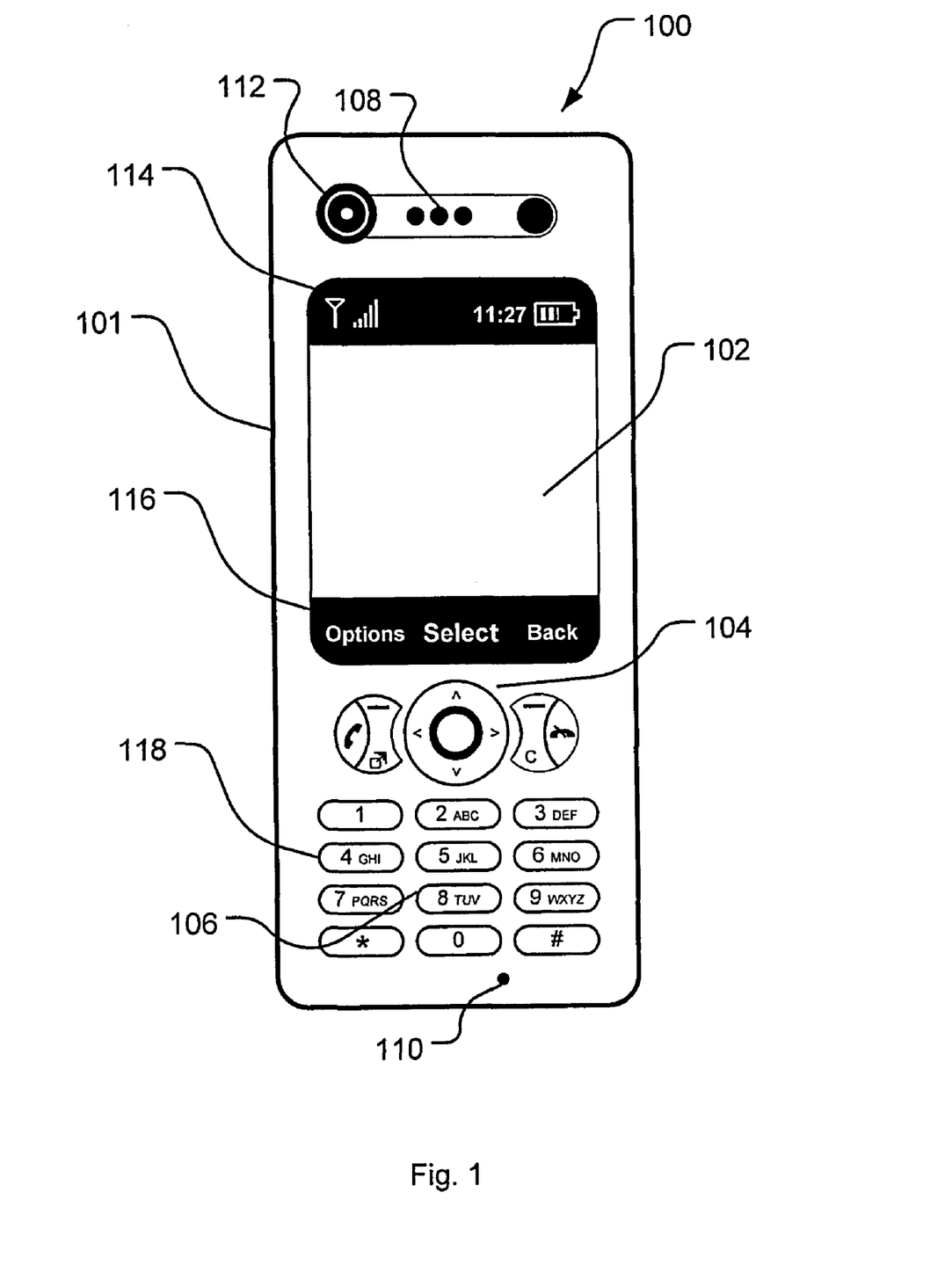
FIG. 1 shows a front view of a mobile communication device, in this case a mobile phone, according to an embodiment of the present invention.

FIG. 1 shows the front side of a mobile communication device 100 comprising a front portion of the casing 101, a display area 102 and means 104 for navigating among items (not shown) displayed in the display area. The display area 102 may comprise a status indication area 114 and one or more softkey bars 116. The status indication area 114 may for example include symbols for indicating battery status, reception quality, speaker on/off, present mode, time and date, etc. The status indication section is not in any way limited to include the symbols and the functions presented herein. The softkey bar 116 is operable using the navigation means 104 or, if using a touch sensitive screen, by tapping the softkey directly with a pen-like object, a finger, or other body part. The functions of the softkeys are not limited by the functions indicated in the figure. Neither are the placements of the softkey bar 116 and the status indication area 114 limited to be placed at the bottom and the top of the screen, as shown in the example. The navigation means 104 can be a set of buttons, a rotating input, a joystick, a touch pad, a multidirectional button, but can also be implemented using a touch sensitive display, wherein the displayed items directly can be tapped by a user for selection, or be voice activated via a headset or a built-in microphone. The mobile communication apparatus 100 can also comprise other elements normally present in such a device, such as a keypad 106 comprising several individual buttons 118, a speaker 108, a microphone 110, a front camera unit 112, a processor (not shown), a memory (not shown), one or more accelerometers (not shown), a vibration device (not shown), an AM/FM radio transmitter and receiver (not shown), a digital audio broadcast transmitter and receiver (not shown), etc.

As described in the background section, QWERTY-keypads such as the one disclosed in document WO 2007/042115, have a very big footprint due to the large twin keys that are used. Reducing the footprint by making the twin keys smaller and/or moving them closer together will result in a reduction of user-friendliness making the operation of the twin keys more difficult and error prone, thus rendering such a keypad useless, especially to users with big fingers. A way to mitigate the problems set forth above is to use rockable keys according to the present invention. As will be described in more detail below, a keypad comprising rockable keys both has a much smaller footprint, thus saving money making in the device, and is much easier to operate due to added spacing between the rockable keys, thus increasing the user-friendliness and reducing the risk of pushing multiple rockable keys when for instance entering characters into the device.

The rockable keys will no be described in further detail using a series of depicted examples.

Figure 2:
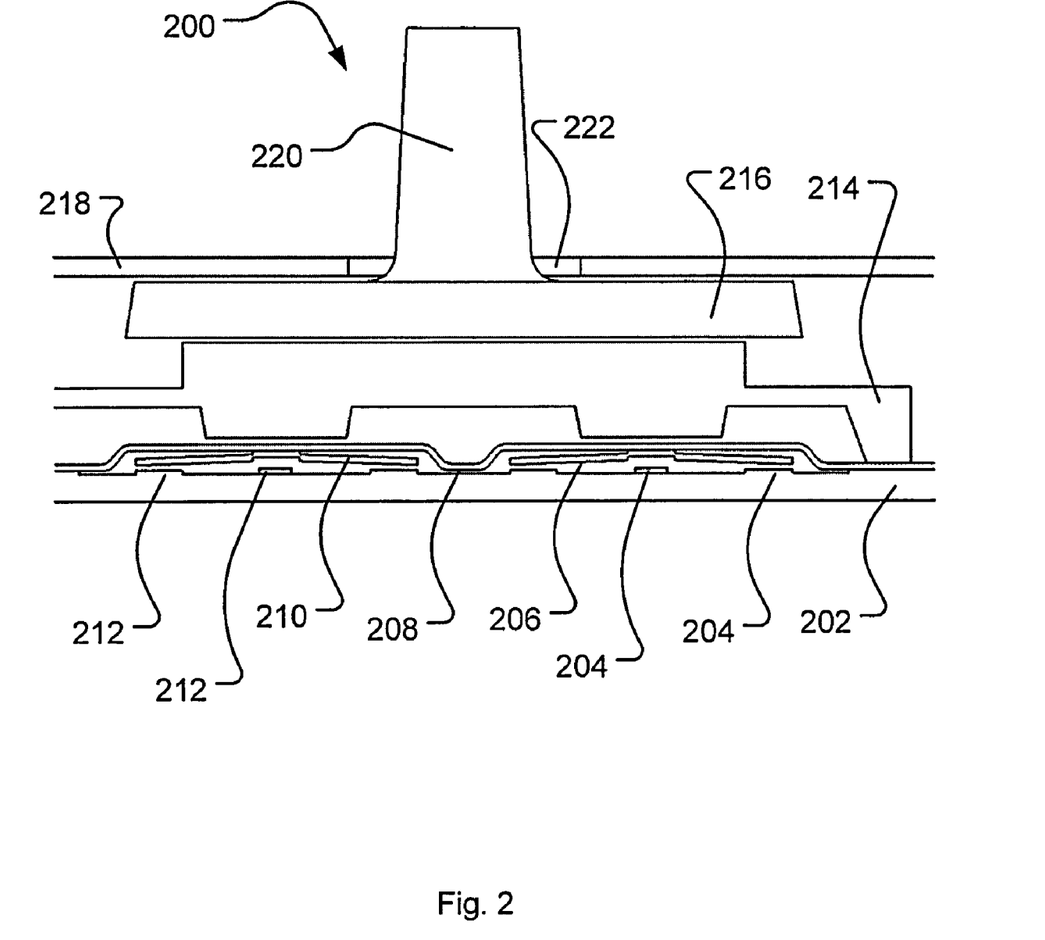
FIG. 2 shows a cut-away side view of a rockable key, according to an embodiment of the present invention.

FIG. 2 shows a cut-away side view of a rockable key 200 according to an embodiment of the present invention. The rockable key comprise a protruding part 220, protruding out through a hole 218 in the device casing 218, connected with a key element 216 situated below the casing and extending, in parallel compared to the casing 218, in such a way that it covers the hole 222 completely or in part. The protruding part 220 may be a separate part which may (or not) be detachable from the key element 216, or made as a single part, thus indistinguishable from the key element 216. The protruding part 220 and the key element 216 may be made out of the same material, or separate materials, such as rubber, silicon, plastic, metal or any other type of rigid or semi-rigid material. The key element 216, together with the protruding part 220, is capable of being rotated in a first and second direction, wherein the first direction may be in a clockwise direction in FIG. 2, and wherein the second direction may be in an anti-clockwise direction in FIG. 2. The key element and the protruding part is rotated in a clockwise direction when the protruding part is subjected to a horizontal, and parallel to the casing, force coming from the left in the figure, and rotated in an anticlockwise direction when the protruding part is subjected to a horizontal, and parallel to the casing, force coming from the right in the figure. A plunger 214, which may be made out of silicon, rubber, plastic or any other type of semi rigid material that may be deformed when pressure is applied to it, is situated below the key element 216. In a resting position, the key element and the plunger may be in contact, or not in contact. When pressure is applied to the whole or a part of the plunger 214, the whole or a part of the plunger 214 will press down onto a dome foil 208, situated beneath the plunger 214. In a resting position, the plunger and the dome foil may be in contact, or not in contact. The dome foil is in this embodiment connected to metal domes 210 and 206, and when pressure is applied to the dome foil 208 the dome foil is deformed resulting in that either one or both domes are pressed against, and short circuits, etched patterns 212 on a PCB/FPC 202, thus forming a key (two per rockable key) which produces a electrical signal when closed/opened. A specific electrical signal is generated depending on how the rockable key is operated and consequently which metal domes that comes into contact with their corresponding etched pattern. In one embodiment the dome foil and the domes are electrically conducting and acting as one part of the electrical switch while the patterns 212 and 204 form the other part of the electrical switch. The dome foil and the metal domes may be made out of any electrical conducting material.

Figure 3A:
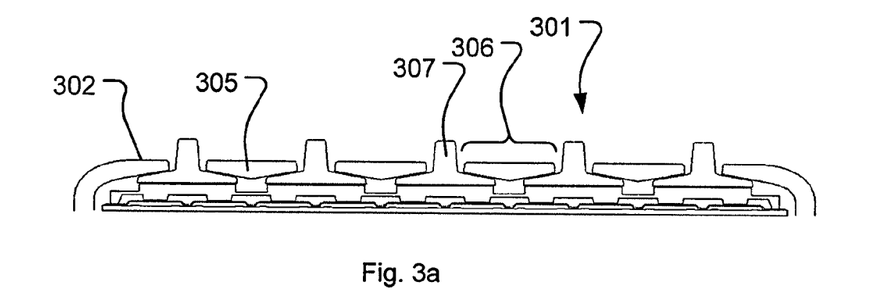
FIG. 3a shows a cut-away side views depicting a collection of rockable keys assembled together in a side-by-side manner, according to an embodiment of the present invention.
Figure 3B:
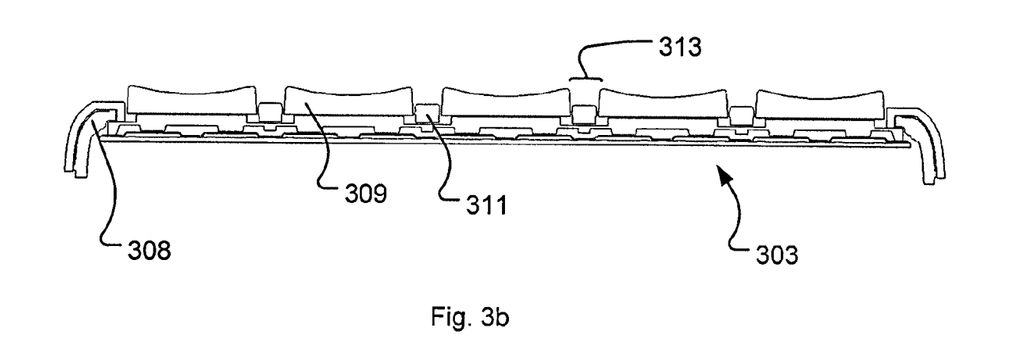
FIG. 3b shows a cut-away side views depicting a collection of twin keys assembled together in a side-by-side manner, according to known prior art.

FIG. 3a shows a cut-away side view of five rockable keys 307 assembled together in a row 301, and mounted in a mobile communication device casing 302 and 306, according to an embodiment of the present invention. FIG. 3b shows a cut-away side view of five twin keys 309, as disclosed in the prior art document WO2007/042115, assembled together in a row 303, and mounted in a mobile communication device casing 308 and 311. The footprint of the individual rockable keys 307, as shown in FIG. 3a, can be made smaller than the footprint of the individual twin keys 309, as shown in FIG. 3b. In this way the total rockable key assembly 301 can be made more compact in its design in comparison to the assembly contain twin keys. This will result in a more compact keypad design which will not consume so much precious casing space in comparison to a keypad design based on the twin key. Also, the spacing between the protruding parts of the rockable keys 306 is much larger, despite the overall more compact design, than the spacing between the protruding parts of the twin keys 313, resulting in a much more user-friendly and ergonomic design.

Figure 4A:
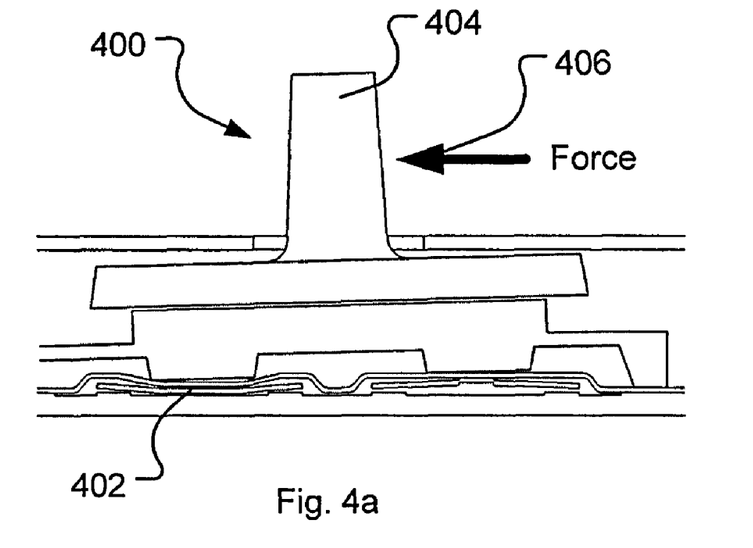
FIGS. 4a and 4b illustrates what happens when a force is applied to the protruding part of a rockable key, according to an embodiment of the present invention.

FIG. 4a illustrates what happens when a rockable key 400 is maneuvered according to an embodiment of the present invention. A force 406, from for example a users finger, is applied on the right side of the protruding part of the rockable key 404. The protruding part, fused or fitted to the key element rotates around it centre and in an anti-clockwise direction. The anti-clockwise movement results in a depression of a part (left part in the figure) of the plunger, which in its turn presses down and deforms the left dome foil, resulting in that the left metal dome makes electrical contact with the etched patterns on the PCB/FPC 402. In this way an electrical signal is produced when the rockable key is pressed to the left, which will correspond to a first selectable mode or character.

Figure 4B:
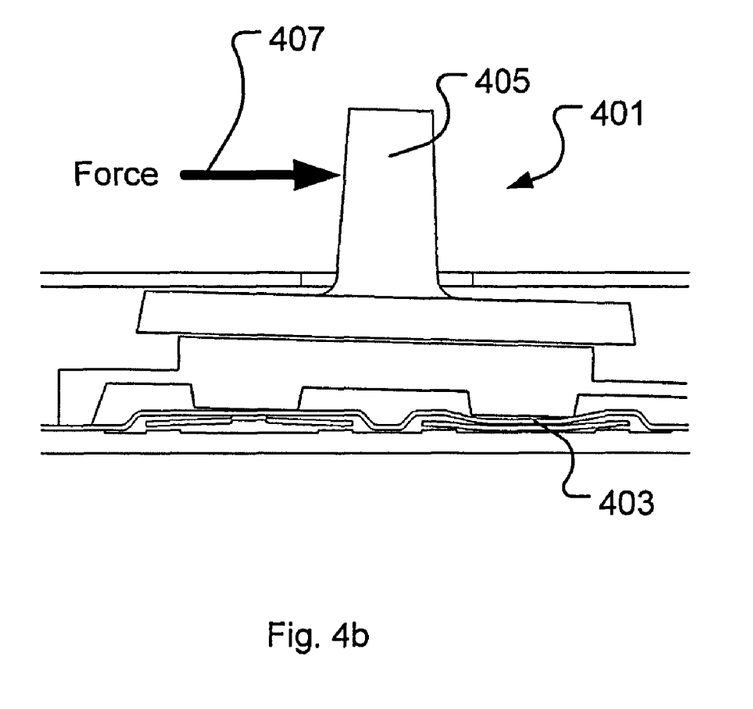

FIG. 4b shows what happens when a rockable key 401 is maneuvered according to an embodiment of the present invention. A force 407, from for example a users finger, is applied on the left side of the protruding part of the rockable key 405. The protruding part, fused or fitted to the key element rotates around it centre and in a clockwise direction. The clockwise movement results in a depression of a part (right part in the figure) of the plunger, which in its turn presses down and deforms the right dome foil, resulting in that the right metal dome makes electrical contact with the etched patterns on the PCB/FPC 403. In this way an electrical signal is produced when the rockable key is pressed to the right which will correspond to a second selectable mode or character.

If the rockable key presented in FIGS. 4a and 4b is subjected to a downward force, in the figure, onto the top part of the protruding part, the key element would press more or less on the whole plunger which in its turn will press down on both the left and the right dome foils simultaneously, resulting in that both the left and right metal domes make contact with both the left and the right etched patterns on the PCB/FPC. In this way two simultaneous signals are produced which will correspond to a third selectable mode or character.

Figure 5:
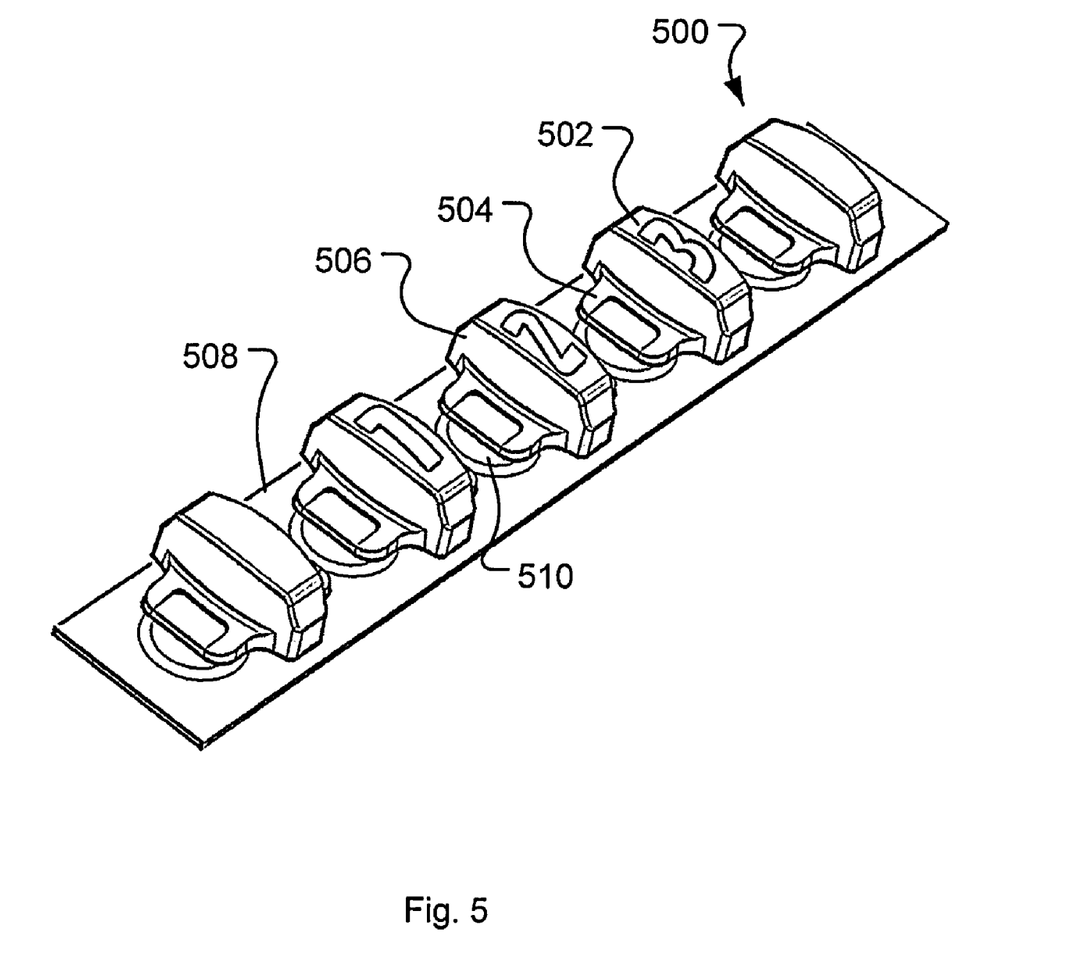
FIG. 5 shows an assembly of five rockable keys on a PCB, according to an embodiment of the present invention.

FIG. 5 shows a 3-dimentional view of a row of assembled rockable keys 500, according to one embodiment of the present invention. This figure shows a 3-dimentional figure of how the rockable keys may be assembled together in a row. The rockable keys may in a similar manner be assembled in columns and/or in a matrix. The row of assembled rockable keys comprise of 5 keys, which in this embodiment have a slightly curved top surface 502, where it is possible to print, mould, etch, or mill off material to produce a marking such as a number, character, or a symbol. The side walls 506 of the rockable keys may be flat or shaped in a way (for instance curved or dome shaped) that makes the key easier to manoeuvre by a finger/body part or an object. The protruding part of the rockable key may be detachable (or not) from the key element 504. The protruding part may be made of plastic, metal, rubber, or silicon like material or a combination of the materials. The key elements pushes down onto a dome foil with electrical conducting domes 510, in which the electrical conducting domes make contact with etched patterns on the PCB 508, producing electrical signals. The shape and form of the rockable keys and the assembly is not in any way limited by the 3-dimentional illustration shown in the figure.

Figure 6:
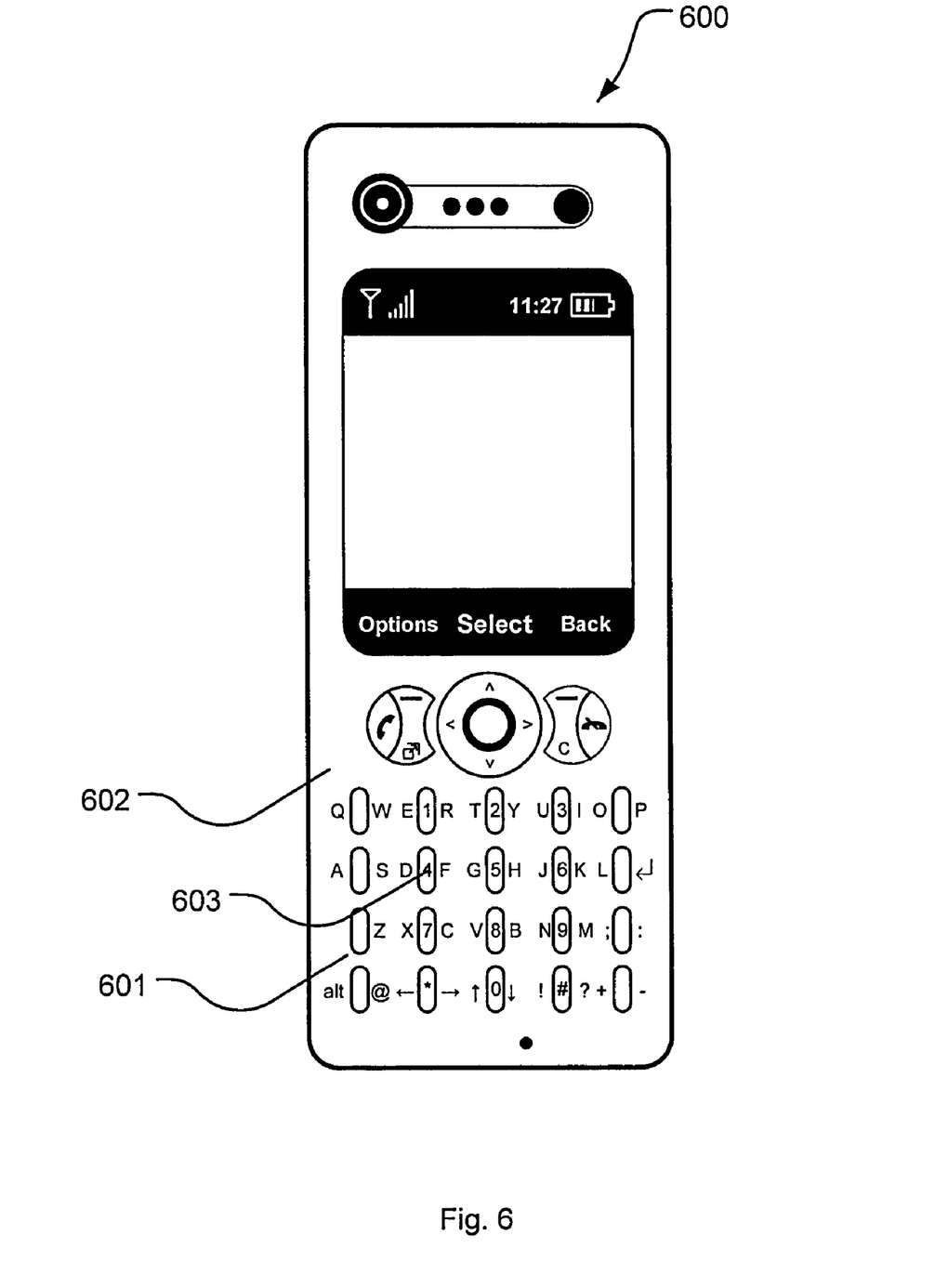
FIG. 6 shows an implementation of a keypad using rockable keys in a mobile communication device, according to an embodiment of the present invention.

FIG. 6 shows an implementation of a QWERTY-keypad 601 comprising rockable keys 603, in a mobile communication device 600, according to an embodiment of the present invention. In this embodiment the QWERTY-keyboard is represented by twenty separate rockable keys 603 protruding out of the mobile communication devices 600 casing 602. In this way a full QWERTY-keyboard may be fitted on to a relative small area on the device without making the device to spacious or bulky, thus in the end reducing both the size and cost of the device. As in previous embodiments described above, the rockable keys may be maneuvered in three different directions, namely to the right (tilting right), left (tilting left), and down (pressing down). On each side of the rockable key the corresponding character is printed on the casing in a QWERTY-layout fashion. For example the second key (from the top) in the second column (from the left) may produce a 'D' if tilted to the left, an 'F' if tilted to the right, and the number '4' if pressed. The numbers and character do not have to be assigned in a QWERTY-layout as shown in the figure. The assignment of characters to each rockable key may be done in any possible way.

Figure 7:
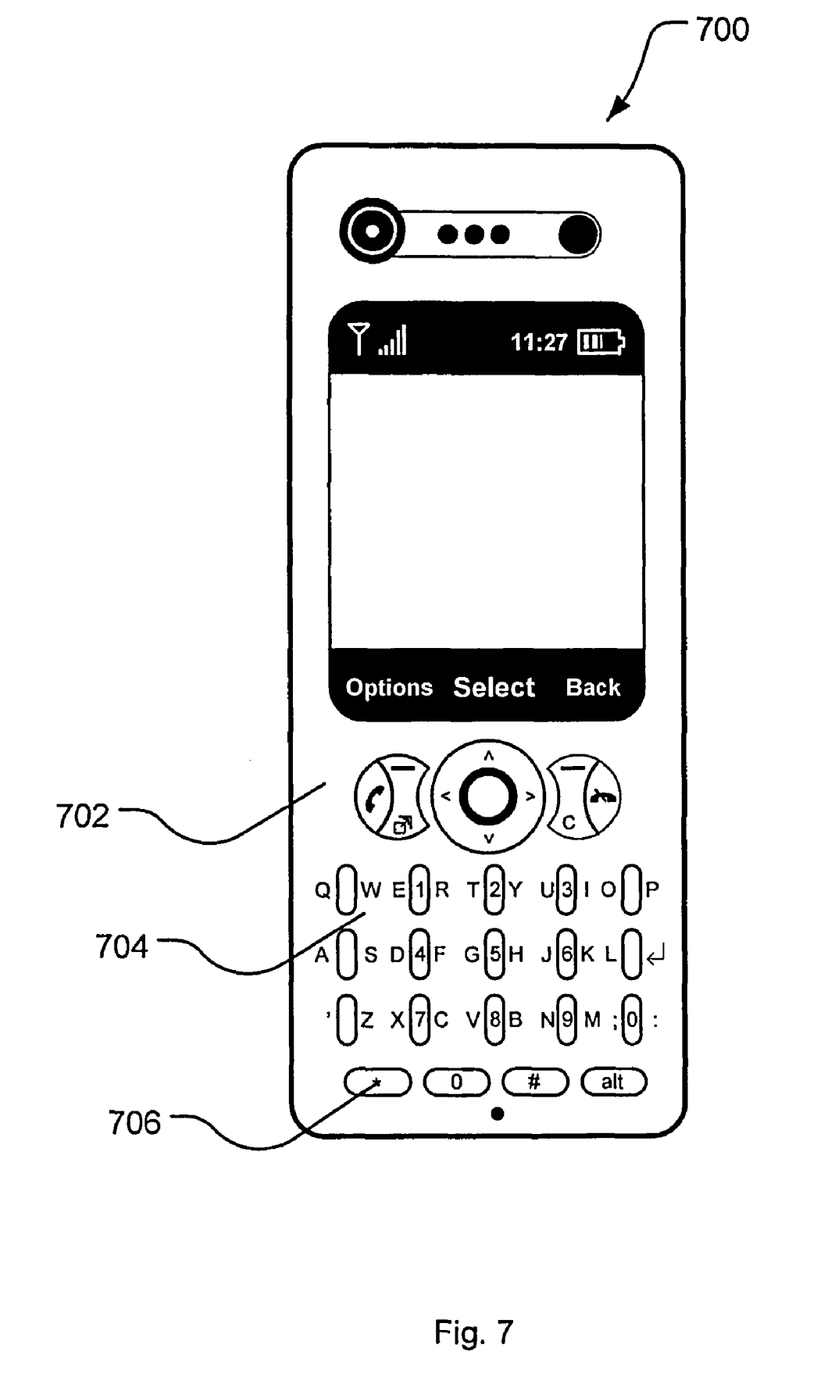
FIG. 7 shows another implementation of a keypad using rockable keys in a mobile communication device, according to an embodiment of the present invention.

FIG. 7 shows another implementation of a QWERTY-keypad 704 comprising rockable keys in a mobile communication device 700, according to an embodiment of the present invention. In this embodiment the QWERTY-keyboard is represented by only fifteen separate rockable keys 704 and four ordinary buttons 706, protruding out of the mobile communication devices 700 casing 702. In this way it is possible to save additional space by eliminating one row of rockable keys and replacing them with ordinary keys as shown in the figure. As with the embodiment presented in conjunction with FIG. 6 the corresponding character is printed on the casing on each side of the rockable keys and on top of the buttons 706, and on some of the rockable keys.

Figure 8:
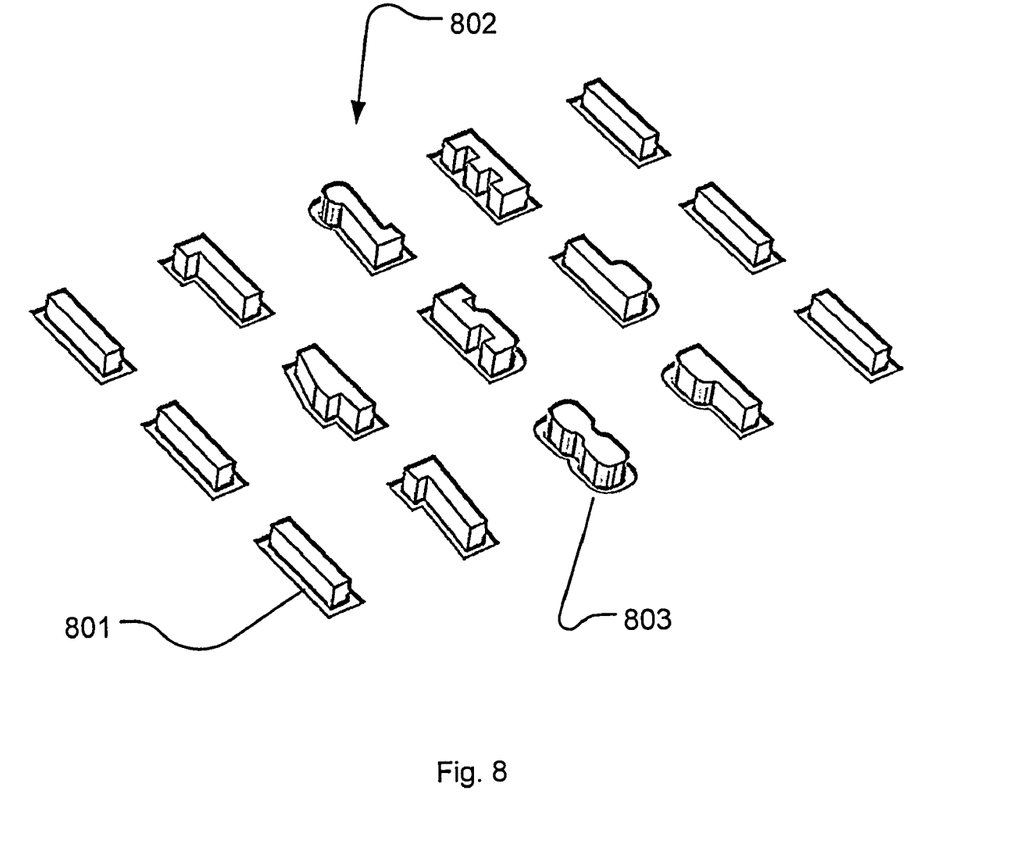
FIG. 8 shows a keypad with rockable keys in the shape of numbers.

FIG. 8 shows an alternative QWERTY-keypad design 802 according to an embodiment of the present invention. The QWERTY-keypad in this embodiment comprise of specially designed rockable keys. The rockable keys in the middle part of the keypad, columns 2, 3, and 4 from the left, are designed as numerical numbers which they might represent, while the other rockable keys, in columns 1 and 5 from the left, are of a rectangular shape 801. For example, if the device is in a numerical mode and the user manoeuvres, either to the left, right, or presses it downwards, the rockable key designed as the number 8 803, the manoeuvre will produce the number 8 in the current active application in the device. In another embodiment, pressing one of the number designed rockable keys produces the corresponding number, while tilting it to the left produces the closest lower number, and tilting it to the right produces the closest higher number. For example, if the user presses the rockable key designed as the number 5 it produces the number five. However, if the user tilts the same rockable key to the left the number 4 is produced while if the rockable key is tilted to the right the number 6 is produced, and so on. This will in some instances speed up the number selection considerably. This way of selecting numbers is not in any way limited to only select numbers. It may in the same manner be used to select other characters or symbols.

Also, by using number shaped rockable keys the need to print a number on a rockable key is eliminated, and it will also increase the user-friendliness since the number shaped rockable keys will stand out visually to the user.

Figure 10:
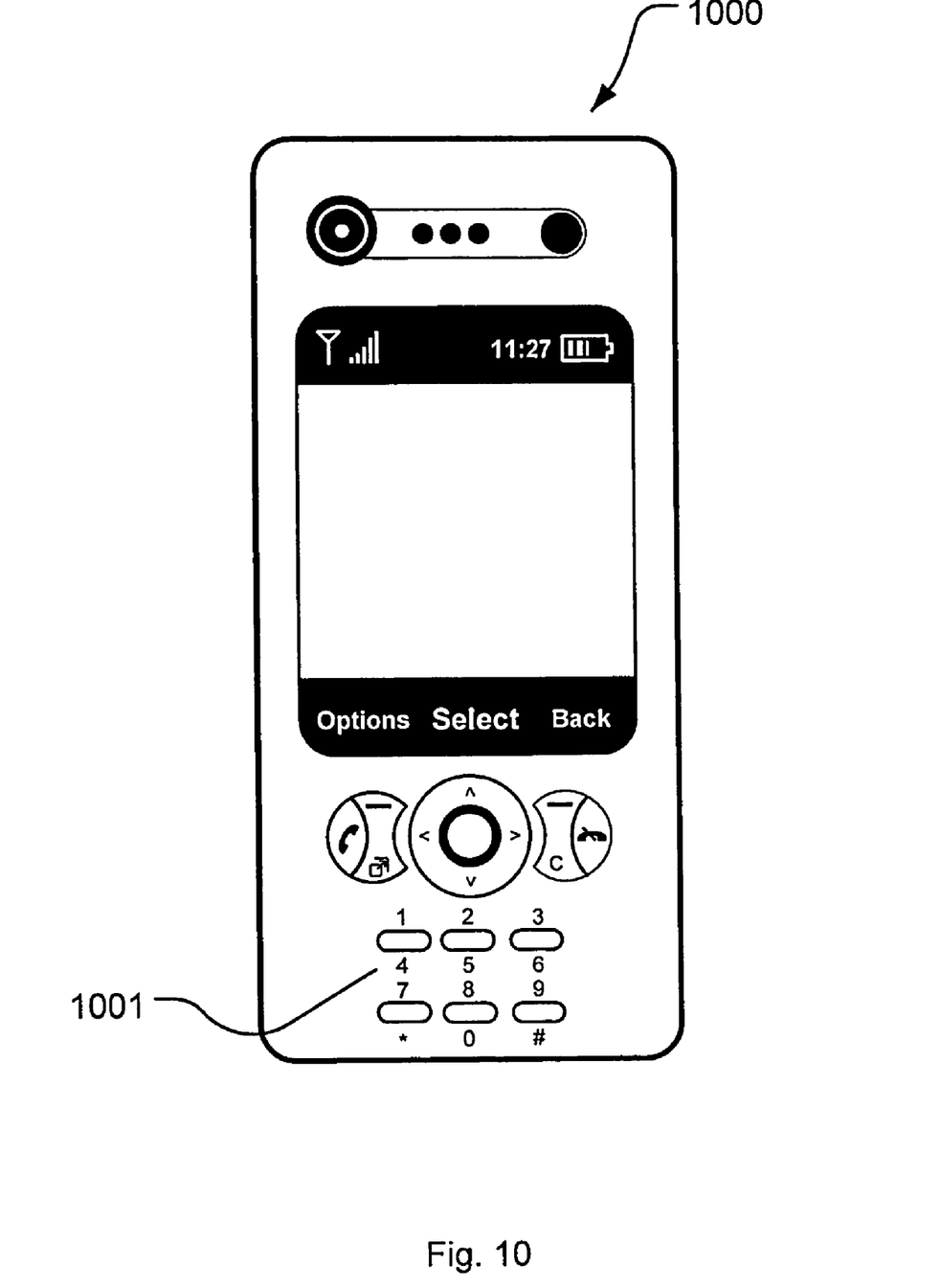
FIG. 10 shows yet another implementation of a keypad using only six rockable keys as a numerical, according to an embodiment of the present invention.

The rockable keys may be shaped and placed in many different ways resulting in different number of rockable keys needed to provide a QWERTY-keypad or just a numerical keypad. For instance, as shown in FIG. 10 only six rockable keys 1001 are needed to perform the function of a standard 12-key numerical keypad, thus reducing the size of the keypad considerably. If the press function of the rockable key is utilized, the numerical keypad in FIG. 10 may be realized using only 4 rockable keys (key 1 tilted left produces number 1, key 1 pressed produces number 2, key 1 tilted right produces the number 3, key 2 tilted left produces number 4, key 2 pressed produces number 5, key 2 tilted right produces the number 6, etc.).

Figure 9:
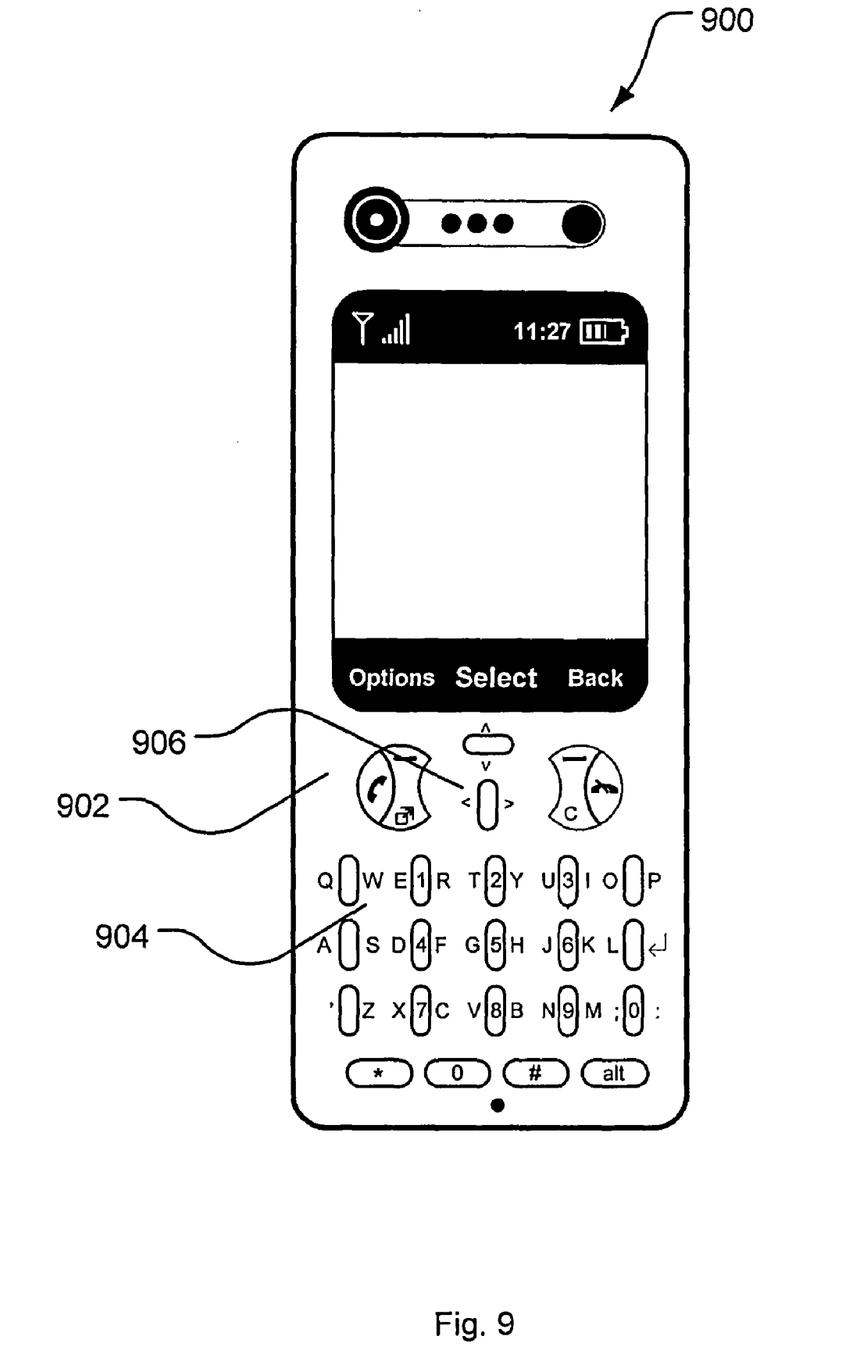
FIG. 9 shows another implementation of a keypad using rockable keys as navigation keys in a mobile communication device, according to an embodiment of the present invention.

FIG. 9 shows a mobile communication device 900 with a QWERTY-keypad comprising rockable keys 904. In this embodiment the mobile communication device 900 is fitted with two rockable keys 906 performing the function of navigation means. Tilting the horizontally placed rockable key up or down will for example move a selection bar up and down in an application running in the device, while tilting the vertically placed rockable keys to the left or right will for example move a selection bar left and right in an application running in the device. In this way the rockable keys may also be used as navigational means in a communication device.

Rockable keys may also be used for performing other functions such as increasing/lowering the volume, turning features on and off, or any other type of operation commonly used in conjunction with a mobile communication device. All rockable keys may be independently back-lighted. For example, if the keypad in FIG. 8 is implemented and the user is in a numerical mode, only the number shaped keys may be back-lighted, while in a character mode all the rockable keys may be back-lighted.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The foregoing has described the principles, preferred embodiments and modes of operation of the present invention. However, the invention should be regarded as illustrative rather than restrictive, and not as being limited to the particular embodiments discussed above. The different features of the various embodiments of the invention can be combined in other combinations than those explicitly described. It should therefore be appreciated that variations may be made in those embodiments by those skilled in the art without departing from the scope of the present invention as defined by the following claims.

The invention claimed is:

1. Mobile communication device, comprising a casing and a keypad comprising a plurality of keys and a plurality of rotatable key elements comprising an elongate protrusion, wherein
   each key element is adapted to depress a first key in a first direction, when rotated in a first rotating direction, and depress a second key in said first direction, when rotated in a second rotating direction;
   each key element is adapted to be rotated in said first rotating direction upon application of a force onto the protrusion in a second direction;
   each key element is adapted to be rotated in said second rotating direction upon application of a force onto the protrusion in a third direction;
   said second and third direction are opposite to each other;
   said first direction is perpendicular to said second and said third direction; and
   said casing has one opening for each protrusion of the key elements and wherein substantially only the protrusions of the key elements are exposed protruding through the respective openings of the casing.

2. The mobile communication device according to claim 1, wherein the protrusion is elongated in a direction coinciding with the normal to the first and second rotating directions.

3. The mobile communication device according to claim 1, wherein the key element is adapted to depress the said first and second key simultaneously upon application of a force on the protrusion in said first direction.

4. The mobile communication device according to claim 1, wherein the keypad comprises at least 18 keys and at least 9 key elements.

5. The mobile communication device according to claim 1, wherein the keypad comprises at least 26 keys and at least 13 key elements.

6. The mobile communication device according to claim 1, wherein the keypad comprises at least 12 keys and at least 6 key elements.

7. The mobile communication device according to claim 1, wherein each key is adapted to send a signal when being depressed, whereby each signal represents a character.

8. The mobile communication device according to claim 1, wherein the keypad is a QWERTY-keypad.

9. The mobile communication device according to claim 1, wherein the first and the second keys and the key element is an integrated part.

10. A method for operating a keypad of a mobile communication device, comprising an elongate protrusion exposed protruding through a casing having one opening for each protrusion and further comprising a plurality of keys and a plurality of rotatable key elements concealed by the casing, comprising the steps of:

rotating the key element in a first rotating direction to depress a first key by operating the protrusion exposed through the opening in the casing; and rotating the key element in a second rotating direction to depress a second key by operating the protrusion exposed through the opening in the casing; and depressing the protrusion exposed through the opening in the casing in a first direction to depress said first and second keys simultaneously; wherein a depression of a key generates a signal which corresponds to a character.

11. The method according to claim 10, wherein a depression of a single key generates a first signal and depression of two keys simultaneously generates a second signal.

12. The method according to claim 10, wherein a first signal corresponds to a letter or a symbol and the second signal corresponds to a number.

* * * * *